(12) United States Patent
Loga et al.

(10) Patent No.: US 8,161,825 B2
(45) Date of Patent: Apr. 24, 2012

(54) ORIFICE FITTING WITH A DRAINAGE SYSTEM

(75) Inventors: Thomas Henry Loga, Sugar Land, TX (US); Moises Martinez, Houston, TX (US); Gary Allen Tatum, Houston, TX (US); Mark Norman Melasky, Houston, TX (US); Anthony Jones, Houston, TX (US)

(73) Assignee: Daniel Measuremant and Control, Inc., Houston, TX (US)

( * ) Notice: Subject to any disclaimer, the term of this patent is extended or adjusted under 35 U.S.C. 154(b) by 525 days.

(21) Appl. No.: 12/496,384

(22) Filed: Jul. 1, 2009

(65) Prior Publication Data
US 2010/0000332 A1    Jan. 7, 2010

Related U.S. Application Data

(60) Provisional application No. 61/077,446, filed on Jul. 1, 2008.

(51) Int. Cl.
*G01F 1/42* (2006.01)
(52) U.S. Cl. .................................................. 73/861.61
(58) Field of Classification Search ............... 73/861.61, 73/861.62
See application file for complete search history.

(56) References Cited

U.S. PATENT DOCUMENTS

| 4,343,193 | A | | 8/1982 | Dawson et al. |
| 4,370,893 | A | * | 2/1983 | Combes ..................... 73/861.61 |
| 4,380,936 | A | * | 4/1983 | Van Scoy ................... 73/861.62 |
| 6,871,666 | B1 | * | 3/2005 | Loga et al. ................ 137/601.18 |
| 2007/0186987 | A1 | | 8/2007 | Loga et al. |

FOREIGN PATENT DOCUMENTS

| JP | 8128872 A | 5/1996 |
| JP | 2006308578 A | 11/2006 |

OTHER PUBLICATIONS

PCT/US2009/049417 International Search Report and Written Opinion, Feb. 5, 2010.

* cited by examiner

*Primary Examiner* — Jewel V Thompson
(74) *Attorney, Agent, or Firm* — Conley Rose, P.C.

(57) ABSTRACT

An orifice fitting having a drainage system. In some embodiments, the orifice fitting includes a housing having a chamber therein, a flow path extending through the chamber, an orifice plate moveable between a first position in the flow path and a second position outside of the flow path, and a rotatable shaft extending through the housing into the chamber. The shaft has a flowbore extending between a first fluid inlet in fluid communication with the chamber and a fluid outlet formed adjacent the end of the shaft.

22 Claims, 12 Drawing Sheets

ORIFICE FITTING WITH A DRAINAGE SYSTEM

CROSS-REFERENCE TO RELATED APPLICATIONS

This application claims benefit of U.S. Provisional Application Ser. No. 61/077,446 filed on Jul. 1, 2008, and entitled "Drainage System for an Orifice Fitting," which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to orifice fittings for measuring fluid flow rates through pipes or other conduits. More particularly, the disclosure relates to a drainage system in a horizontally-installed orifice fitting for measuring fluid flow.

In pipeline operations and other industrial applications, flow meters are used to measure the volumetric flow rate of a liquid or gaseous flow stream moving through a piping section. Flow meters are available in many different forms. One common flow meter is an orifice meter, which includes an orifice fitting connected to the piping section. The orifice fitting serves to orient and support an orifice plate that extends across the piping section perpendicular to the direction of the flow stream. The orifice plate is generally a thin plate that includes a circular opening, or orifice, which is typically positioned concentric with the flow stream.

In operation, when the flow stream moving through the piping section reaches the orifice plate, the flow is forced through the orifice, thereby constricting the cross-sectional flow area of the flow. Due to the principles of continuity and conservation of energy, the velocity of the flow increases as the stream moves through the orifice. This velocity increase creates a pressure differential across the orifice plate, which can be measured and used to calculate the volumetric flow rate of the flow stream moving through the piping section.

A dual chamber orifice fitting embodies a special design that enables the orifice plate to be removed from the fitting without interrupting the flow stream moving through the piping section. A common dual chamber orifice fitting 10 is illustrated in cross-section by FIG. 1. Orifice fitting 10 includes a body 12 and a top 14 coupled thereto. Body 12 encloses a lower chamber 16 in fluid communication with a bore 18 extending through body 12. When orifice fitting 10 is coupled to a piping section, bore 18 is in fluid communication with a flowbore through the piping section. Top 14 encloses an upper chamber 20 and is connected to body 12 by one or more fastening devices 22. Aperture 24 defines an opening connecting upper chamber 20 to lower chamber 16. A valve seat 26 is connected to top 14 about aperture 24. A valve plate assembly 28 sealingly engages valve seat 26. Valve plate assembly 28 is slidably actuated by a gear shaft 30 to open and close aperture 24. Orifice fitting 10 further includes lower drive 32 and an upper drive 34 which are operable to move an orifice plate carrier 36 vertically between lower chamber 16 and upper chamber 20 when aperture 24 is open. Orifice plate carrier 36 sealing engages the wall of body 12 when disposed within bore 18 and supports an orifice plate 38 having an orifice 40 extending therethrough.

In operation, orifice plate carrier 36 is disposed within lower chamber 16, and aperture 24 is closed by valve plate assembly 28, thereby hydraulically isolating lower chamber 16 from upper chamber 20. Pressurized fluid flow in bore 18 passes through orifice 40 of orifice plate 38. Pressure up and downstream of orifice plate 38 is measured via instrumentation installed within meter tap holes 42. The measured pressure differential across orifice plate 38 is then used to estimate the rate of fluid flow through fitting 10. In order to obtain accurate estimates of the flow rate through fitting 10, all of the flow moving through the piping section must pass through orifice 40. If any flow bypasses, or flows around, orifice 40, an error in the measurement of the pressure differential across orifice plate 38 occurs. To prevent flow from bypassing orifice 40, a seal 44 is disposed between orifice plate 38 and orifice plate carrier 36.

When the pressure within lower chamber 16 is lower than that of bore 18, the pressure within bore 18 will tend to urge orifice plate carrier 36 upward and into lower chamber 16, potentially causing misalignment between orifice 40 and bore 18 that can decrease measurement accuracy. Further, seal 44, which is usually constructed from an elastomer or polymer, may fail due to the pressure differential between bore 18 and lower chamber 16. In order to counter the pressure differential, an equalization flow path or weephole 46 is included between lower chamber 16 and bore 18. Weephole 46 enables fluid communication between bore 18 and lower chamber 16, and thus, pressure equalization across orifice plate carrier 36. Weephole 46 is preferably positioned upstream of orifice 40 so as to be located in the region of highest pressure within bore 18.

Gas flow passing through orifice fittings, such as fitting 10, may contain moisture. Over time, some of that moisture may collect within the fitting. Due to the effect of gravity, the moisture will collect at the lowest point of the fitting body. The lowest point of body depends on the installed orientation of the fitting. For example, orifice fitting 10 is designed to be installed in the vertical orientation, as shown in FIG. 1. In that orientation, moisture accumulates in a region 48 proximate the base of bore 18, particularly near the upstream side of plate 38. Given sufficient time, moisture accumulation may rise to a level at or above meter tap holes 42, thereby exposing flow measuring components disposed within meter tap holes 42 to the accumulated moisture. Exposure of these components to moisture may cause failure of these components, impeding the ability of orifice fitting 10 to provide accurate flow measurements.

Turning to FIG. 2, body 12 of orifice fitting 10 may be modified to include one or more drain ports 50 to alleviate the moisture accumulation in region 48. These ports 50 may be capped with plugs 52 that are removable to allow drainage of moisture from body 12. The effectiveness of ports 50 in enabling drainage of moisture from body 12 is dependent upon the installed orientation of orifice fitting 10. When fitting 10 is installed in the vertical orientation, such that a side 60 of body 12 is proximate the ground 70 and top 14 of fitting 10 is distal the ground 70, as shown in FIG. 2, drain ports 50 are positioned proximate the lowest portion of body 12. Consequently, moisture within fitting 10 tends to accumulate proximate drain ports 50 and may be drained from fitting 10 when plugs 52 are removed from ports 50.

However, orifice fitting 10 is frequently installed in a horizontal orientation, as illustrated in FIG. 3. In the horizontal orientation, one set of meter tap holes 42 is located in a lower side 54 of body 12 proximate the ground 70, while the other set of meter tap holes 42 is located in an upper side 56 of body 12 distal ground 70. Because moisture within body 12 will tend to accumulate near lower side 54, flow measuring components installed within meter tap holes 42 proximate this side 54 are vulnerable to the accumulated moisture. Hence, these holes 42 are not typically fitted with flow measuring components. Instead, the flow measuring components will be coupled to meter tap holes 42 in upper side 56 of body 12, away from the region where moisture will collect.

During operation, moisture, including particulates such as sand, will collect over lower side 54 of body 12, and in particular within a region 58 proximate lower drive 32. Region 58 is lower than the drain port 50 formed in lower side 54 of body 12. Consequently, when plug 52 is removed from this drain port 50 to drain accumulated moisture from body 12, moisture and particulates within region 58 will not be removed from body 12. Overtime, this moisture and sediment may cause damage to fitting 10 at this location.

Further, when plate carrier 36 is moved between lower chamber 16 and upper chamber 20, valve plate assembly 28 slides relative to valve seat 26 to open and close aperture 24. Due to the presence of moisture accumulation in body 12, particulates in body 12 may get agitated with movement of plate carrier 36 between chambers 16, 20 and adhere to the interfaces between valve plate assembly 28 and valve seat 26. These particulates may prevent effective sealing between valve plate assembly 28 and valve seat 26.

Accordingly, there remains a need in the art for a drainage system for a horizontally installed orifice fitting that addresses these and certain other limitations of the prior art.

SUMMARY OF THE DISCLOSURE

A fluid flow measurement system, or orifice fitting, with a drainage system is disclosed. In some embodiments, the fluid flow measurement system includes a housing having a chamber therein, a flow path extending through the chamber, an orifice plate moveable between a first position in the flow path and a second position outside of the flow path, and a rotatable shaft extending through the housing into the chamber. The shaft has a flowbore extending between a first fluid inlet in fluid communication with the chamber and a fluid outlet formed adjacent the end of the shaft.

In other embodiments, the fluid flow measurement system includes a housing having a chamber therein, a flow conduit extending through the chamber, an orifice plate moveable between the flow conduit and the chamber, a rotatable shaft extending through the housing into the chamber, a first flow path extending from the chamber through the shaft, and a second flow path extending from the chamber through the housing.

In still other embodiments, the orifice fitting includes a housing with a chamber disposed therein, a flow path extending through the chamber, an orifice plate moveable between a first position in the flow path and a second position outside of the flow path, a stuffing box extending through the housing, the stuffing box having a throughbore extending therethrough, and a rotatable shaft extending through the chamber and having an end supported within the throughbore. The shaft has a flowbore in fluid communication with the chamber and the throughbore of the stuffing box.

Thus, embodiments described herein comprise a combination of features and characteristics intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

For a more detailed understanding of the present invention, reference is made to the accompanying Figures, wherein.

DETAILED DESCRIPTION OF THE DISCLOSED EMBODIMENTS

Figure 1:
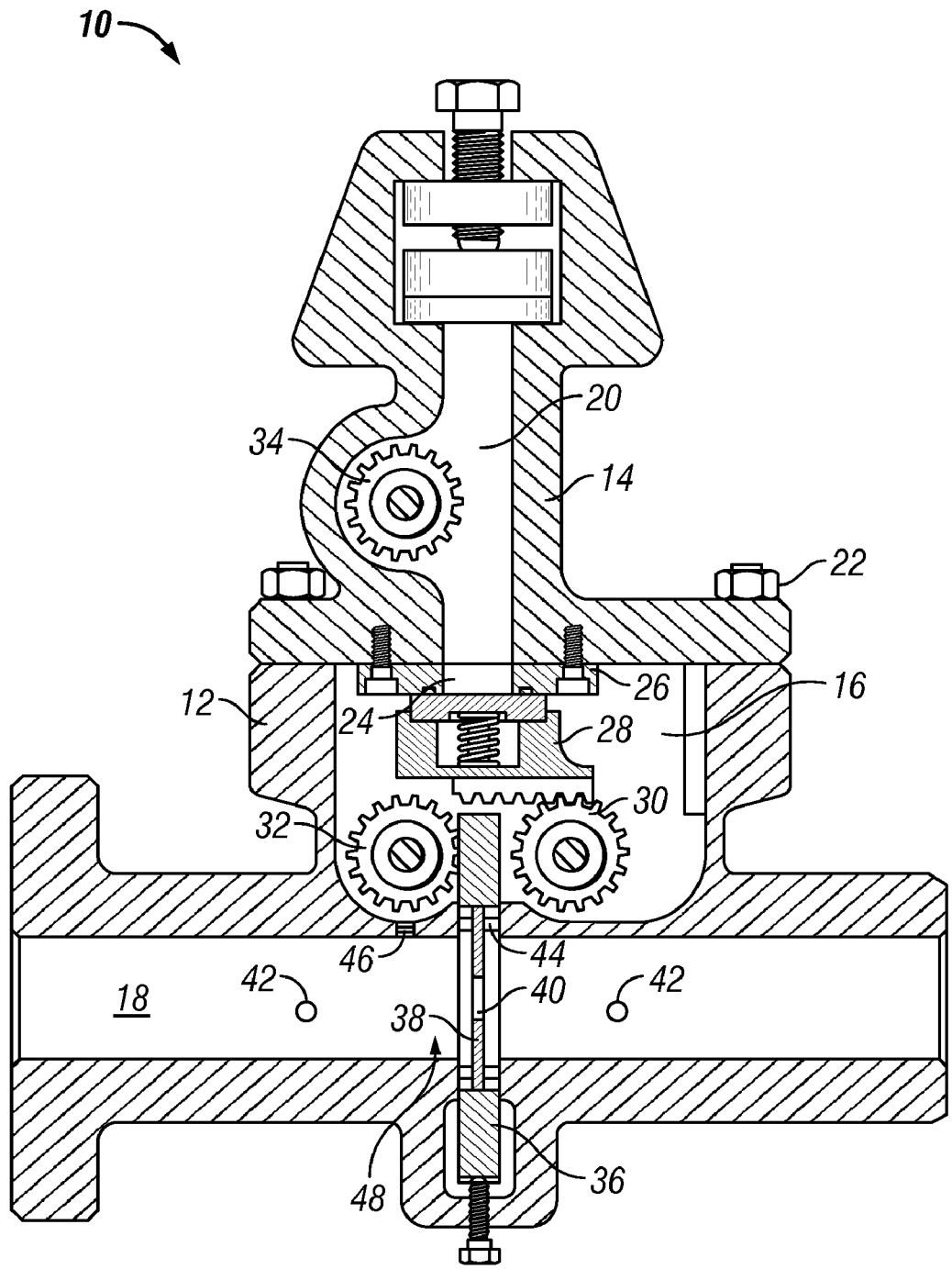
FIG. 1 is a cross-sectional view of a conventional dual chamber orifice fitting.
Figure 2:
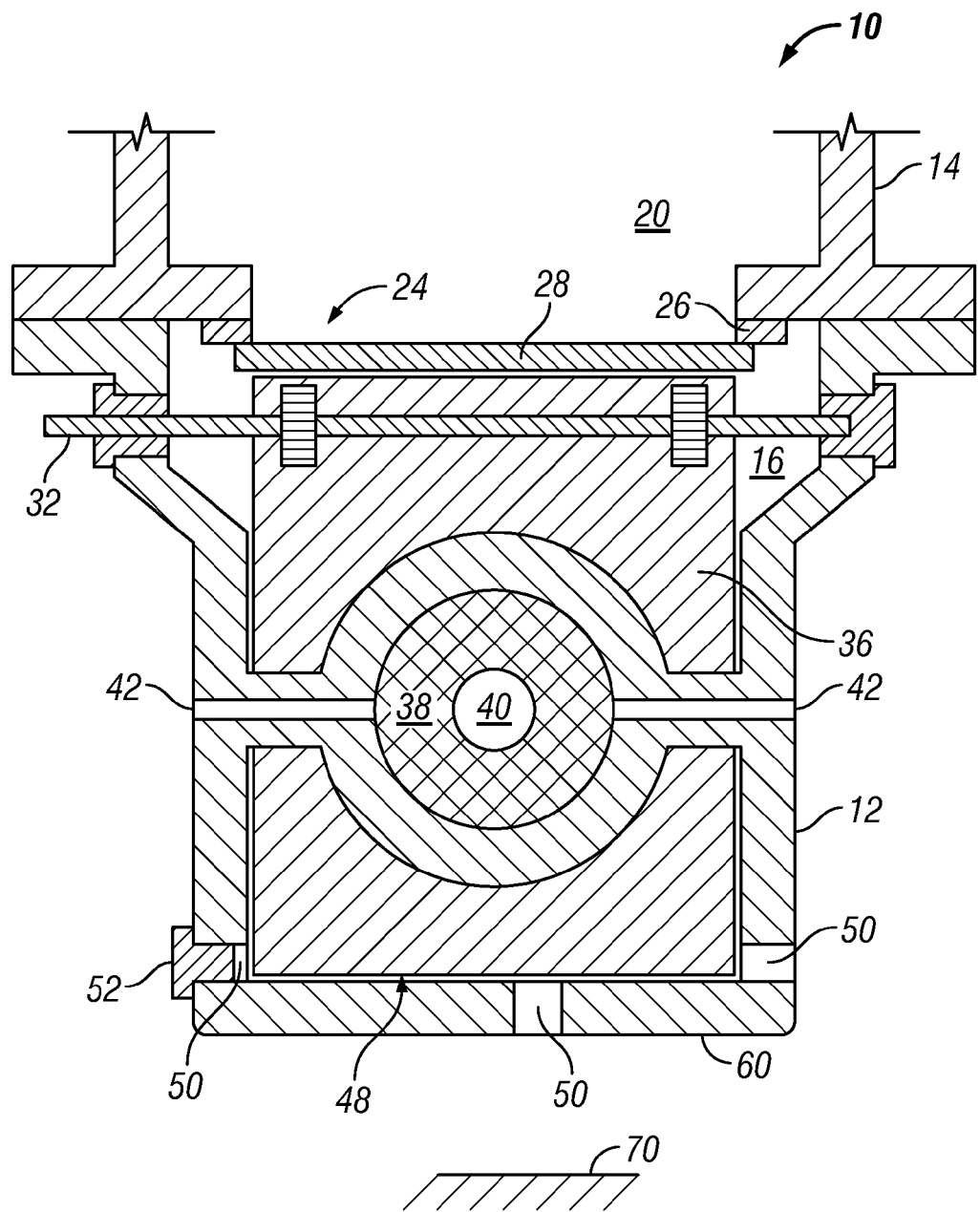
FIG. 2 is another cross-sectional view of the orifice fitting of FIG. 1.
Figure 3:
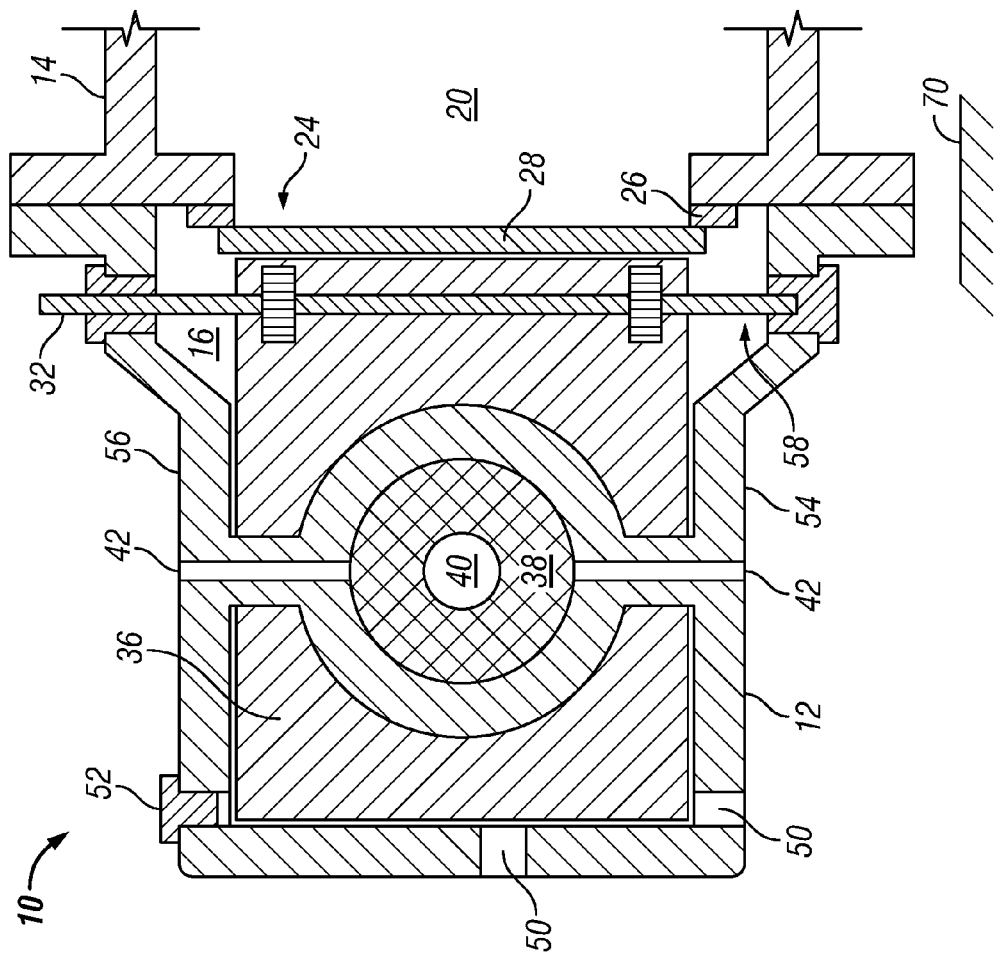
FIG. 3 is a cross-sectional view of the orifice fitting of FIG. 2 installed in a horizontal orientation.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Figure 4:
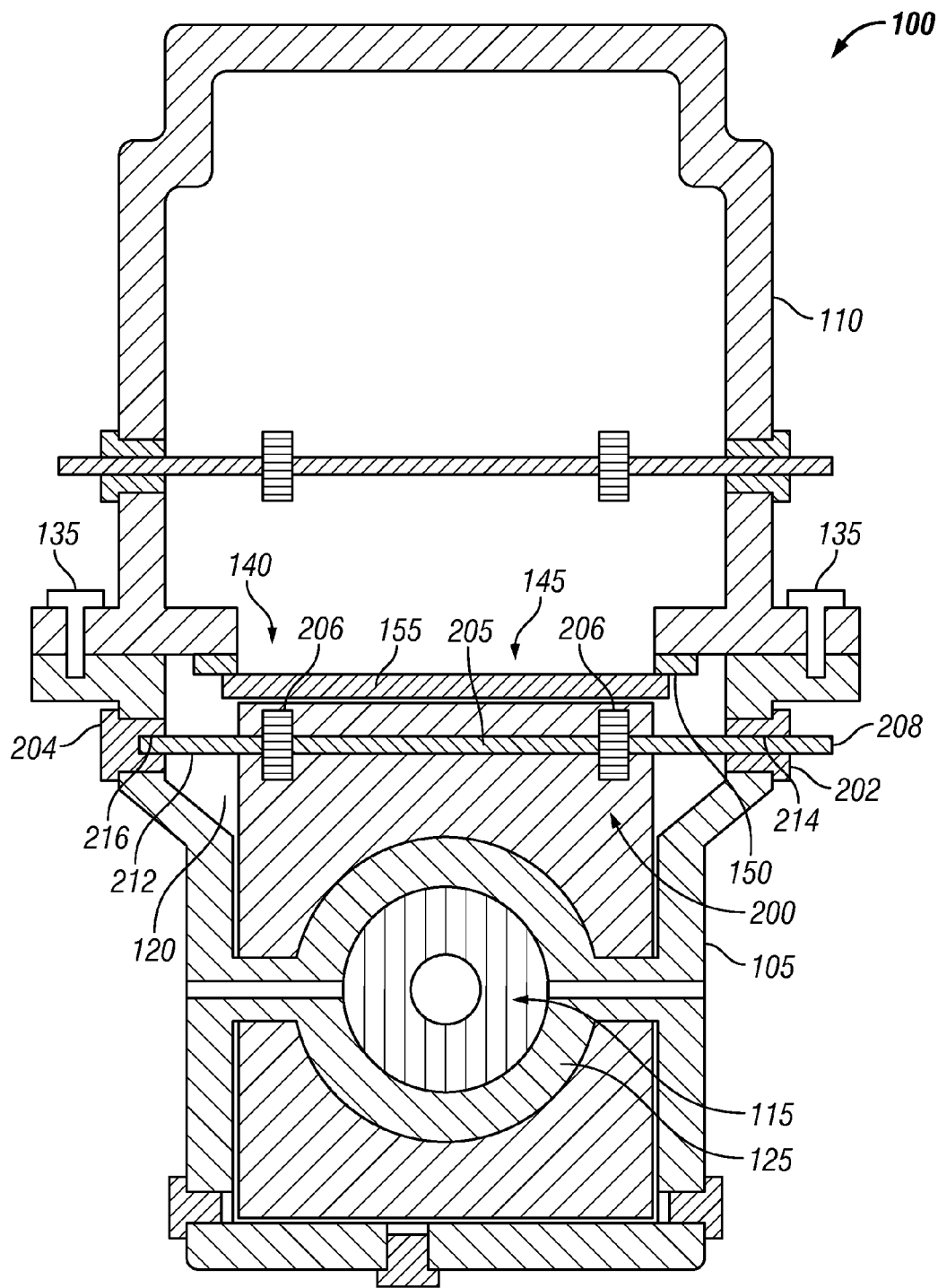
FIG. 4 is a cross-sectional view of an embodiment of a dual chamber orifice fitting with a drainage system in accordance with the principles disclosed herein (viewed from downstream)

Referring now to FIG. 4, an embodiment of a dual chamber orifice fitting with a drainage system in accordance with the principles disclosed herein is shown. Orifice fitting 100 is shown in cross-section as viewed from downstream and looking upstream. Orifice fitting 100 includes a body 105 and a top 110 coupled thereto by a plurality of fastening devices 135. Body 105 encloses a lower chamber 120 in fluid communication with a bore 115 of a flow conduit 125 extending through body 105. When orifice fitting 100 is coupled to a piping section (not shown), bore 115 is in fluid communication with a flowbore through the piping section. Top 110 encloses an upper chamber 130 and has an aperture 140 that defines an opening connecting upper chamber 130 to lower chamber 120.

Orifice fitting 100 further includes a valve assembly 145 operable to open and close aperture 140. Valve assembly 145 includes a valve seat 150 connected to top 110 about aperture 140 and a valve plate 155 sealingly engaged with valve seat

150. Valve plate 155 is slidably actuated by gear shaft assembly 200 to open and close aperture 140.

Gear shaft assembly 200 includes a rotatable, straight shaft 205, two stuffing boxes 202, 204 extending through opposing walls of fitting body 105, and a pair of gears 206. Gears 206 are disposed about shaft 205 in engagement with valve plate 155. When shaft 205 is rotated, the engagement between gears 206 and valve plate 155 enables valve plate 155 to be translated to open or close aperture 140, as desired. Shaft 205 has two opposing ends 208, 212. Shaft 205 is supported by stuffing box 202 proximate end 208, which extends through a bore 214 of stuffing box 202, as illustrated. Shaft 205 is supported by stuffing box 204 proximate end 212, which extends into a bore 216 of stuffing box 204.

Figure 5:
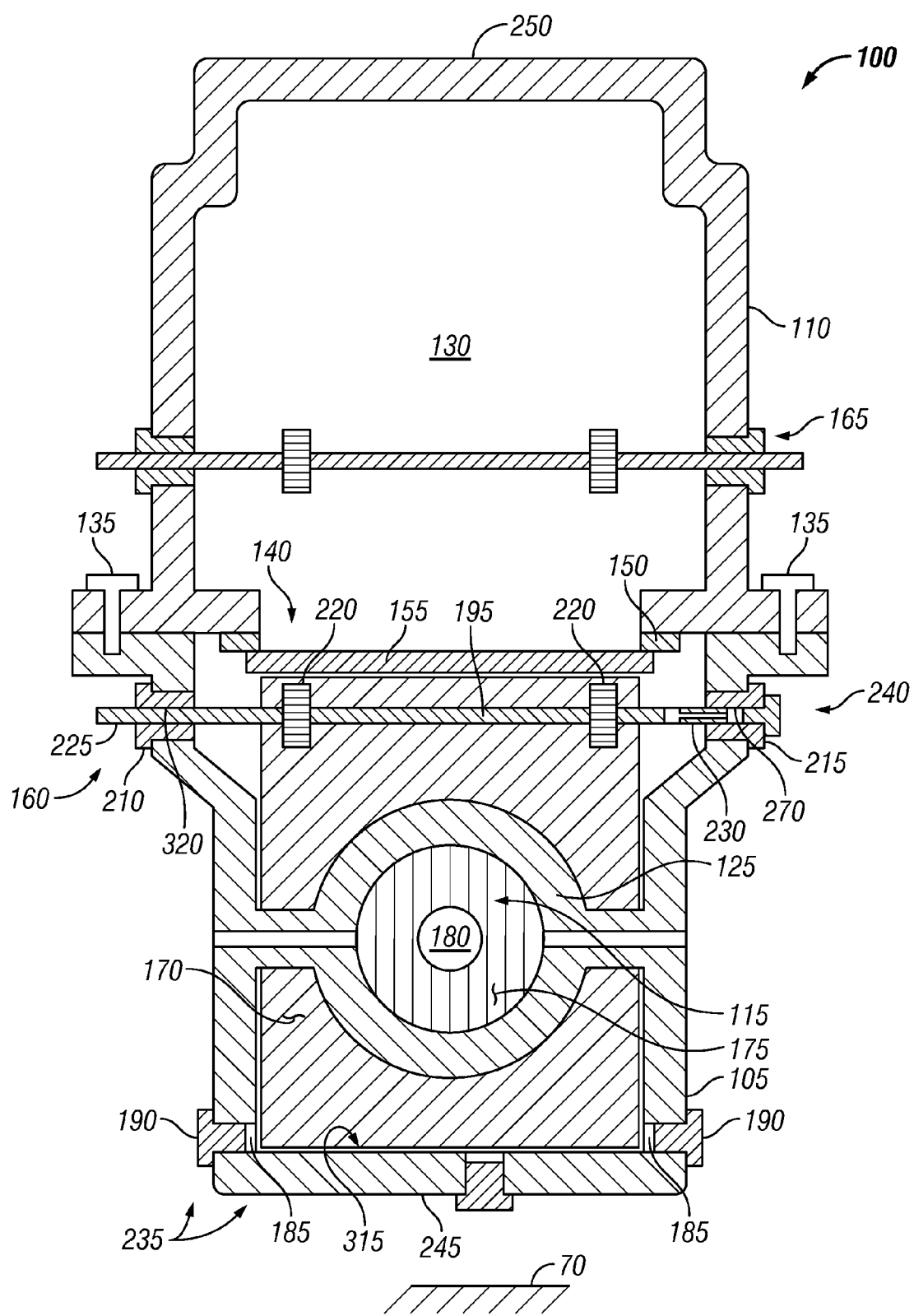
FIG. 5 is a cross-sectional view of the dual chamber orifice fitting of FIG. 4 (viewed from upstream)

Turning to FIG. 5, orifice fitting 100 is again shown in cross-section but viewed from upstream looking downstream. Orifice fitting 100 further includes a lower drive assembly 160 and an upper drive assembly 165 which are operable to move an orifice plate carrier 170 vertically between lower chamber 120 and upper chamber 130 when aperture 140 is open. Orifice plate carrier 170 sealing engages the wall of body 105 when disposed within bore 115 of flow conduit 125, as shown, and supports an orifice plate 175 having an orifice 180 extending therethrough.

Lower drive assembly 160 includes a rotatable, straight shaft 195, two stuffing boxes 210, 215 extending through opposing walls of fitting body 105, and a pair of gears 220. Gears 220 are disposed about shaft 195 in engagement with orifice plate carrier 170. When shaft 195 is rotated, the engagement between gears 220 and orifice plate carrier 170 enables plate carrier 170 to be raised or lowered, as desired. Shaft 195 has two opposing ends 225, 230. Shaft 195 is supported by stuffing box 210 proximate end 225, which extends through a bore 320 of stuffing box 210, as illustrated. Shaft 195 is supported by stuffing box 215 proximate end 230, which extends into a bore 270 of stuffing box 215.

To enable drainage of moisture that may accumulate within orifice fitting 100, including sediment suspended therein, orifice fitting 100 further includes a vertical drainage system 235 and a horizontal drainage system 240. Vertical drainage system 235 enables the drainage of moisture that may accumulate within orifice fitting 100 when installed in a vertical orientation, as illustrated in FIG. 5. In this orientation, the lowermost portion of fitting 100 is the end 245 of fitting body 105 opposite aperture 140, and the uppermost portion of fitting 100 is the end 250 of fitting top 110 opposite aperture 140. Vertical drainage system 235 includes one or more drain ports 185 and an equal number of plugs 190, each plug 190 insertable into and removable from a drain port 185. Each drain port 185 extends from lower chamber 120 through fitting body 105 proximate end 245.

During operation of orifice fitting 100, a plug 190 is inserted into each drain port 185 to form a seal therebetween and prevent the loss of pressurized fluid therethrough. When orifice fitting 100 is installed in the vertical orientation, as shown, moisture which may accumulate within fitting 100 will collect within a region 315 of lower chamber 120 that is proximate end 245 of fitting 100 and thus vertical drainage system 235. Consequently, when it is desirable to drain the accumulated moisture from orifice fitting 100, plugs 190 may be removed from drain ports 185, thereby enabling the accumulated moisture to flow from orifice fitting 100 through drain ports 185.

Figure 6:
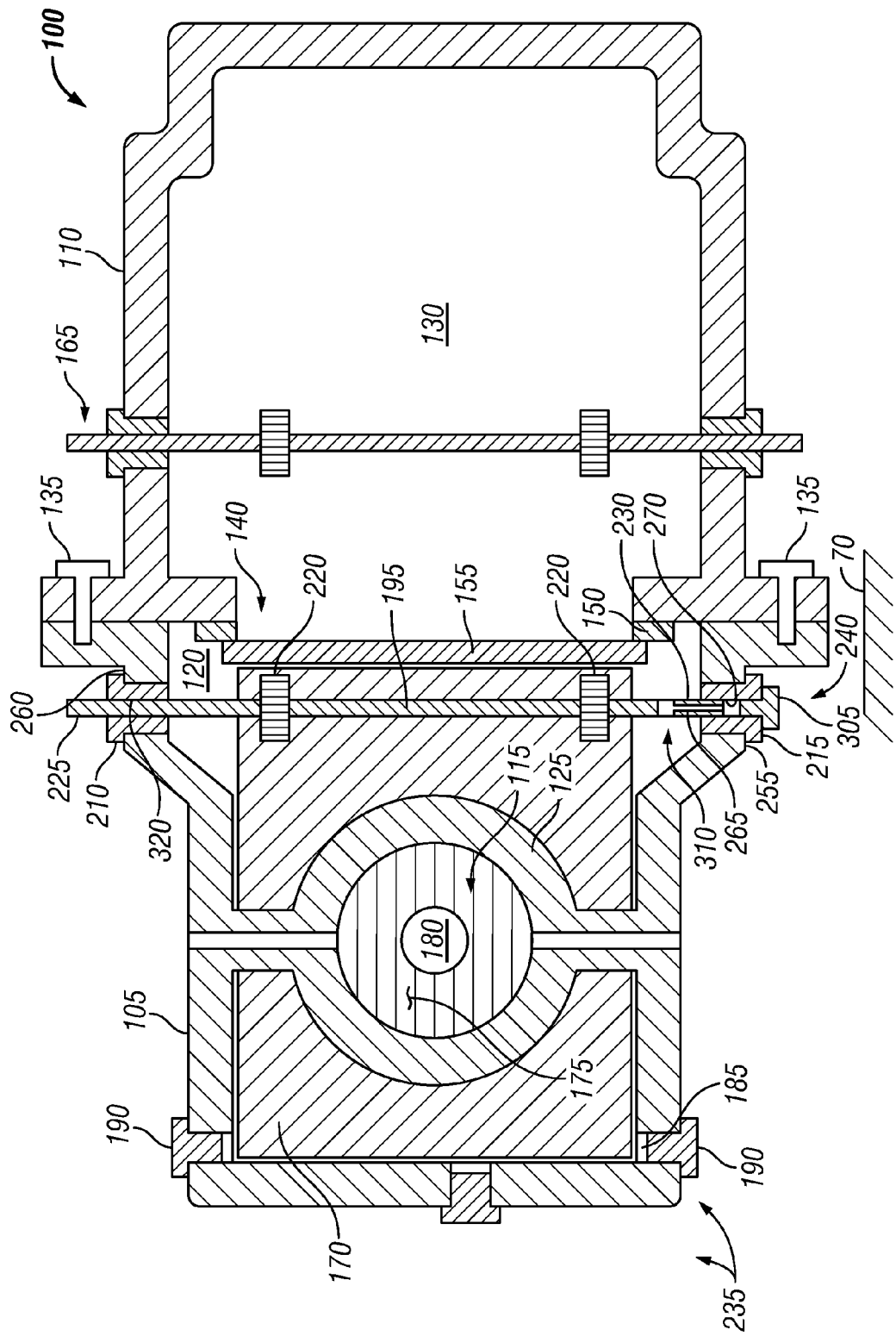
FIG. 6 is a cross-sectional view of the orifice fitting of FIG. 5 installed in a horizontal orientation.

Horizontal drainage system 240 enables the drainage of moisture that may accumulate within orifice fitting 100 when installed in a horizontal orientation, as illustrated by FIG. 6. Referring now to FIG. 6, in this orientation, the side 255 of fitting body 105 through which stuffing box 215 extends is disposed below the side 260 of fitting body 105 through which stuffing box 210 extends. In other words, sides 255, 260 are the lower and upper sides, respectively, of fitting body 105.

Figure 7:
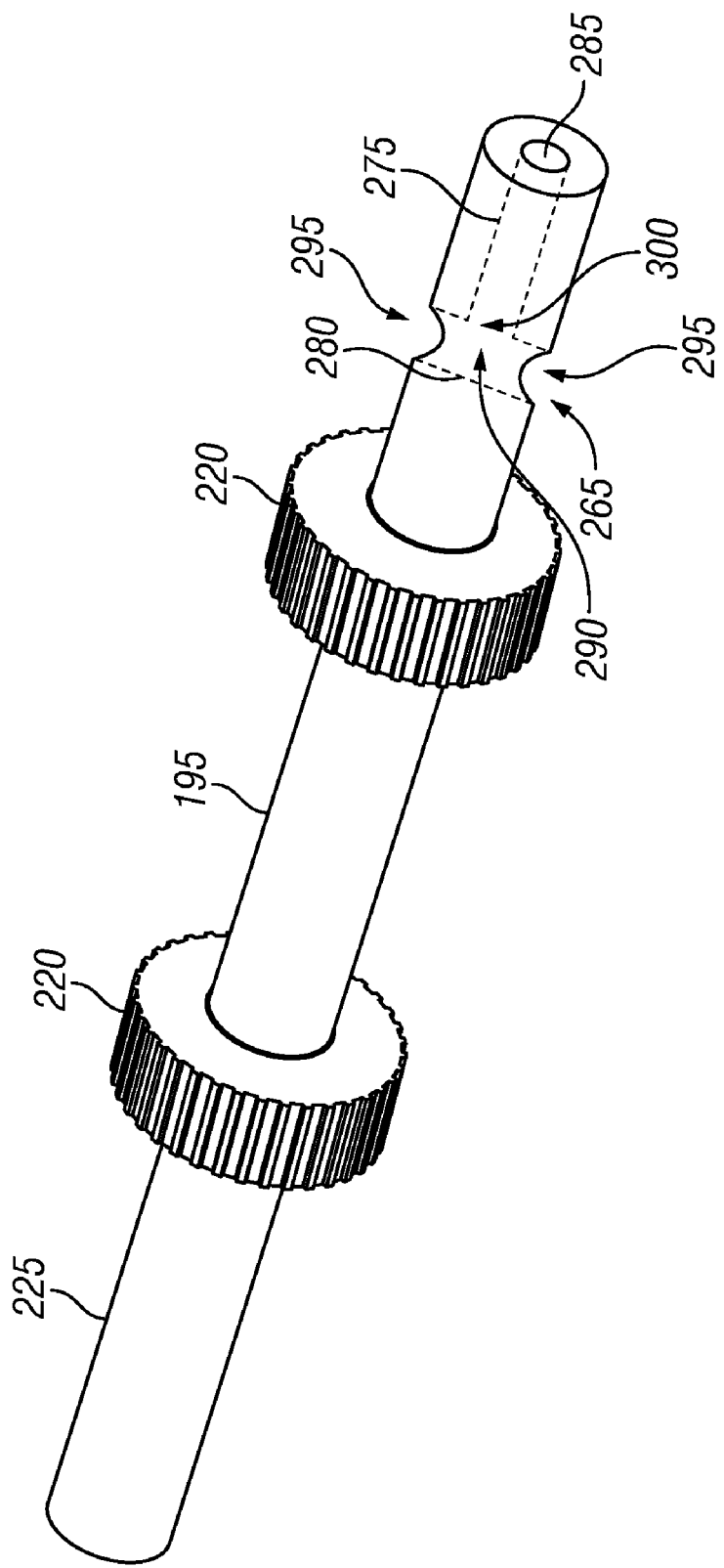
FIG. 7 is a perspective view of the lower drive shaft of the orifice fitting of FIG. 5, illustrating a portion of the drainage system formed therein.

Drainage system 240 includes a biaxial flowbore 265 formed in shaft 195 proximate end 230 and a plug 305 that is insertable within throughbore 270 of stuffing box 215. Biaxial flowbore 265 enables fluid communication between lower chamber 120 and throughbore 270. Referring now to FIG. 7, biaxial flowbore 265 is formed by two intersecting and substantially perpendicular flowbores 275, 280. Flowbore 275 extends longitudinally within shaft 195. Longitudinal flowbore 275 has an inlet 290 and an outlet 285 in fluid communication with throughbore 270 (FIG. 6) of stuffing box 215. Flowbore 280 extends radially through straight shaft 195. Radial flowbore 280 has two opposing inlets 295 in fluid communication with lower chamber 120 (FIG. 6) and an outlet 300 in fluid communication with inlet 290 of longitudinal flowbore 275.

As illustrated in FIG. 7, end 230 of shaft 195 is circular in cross-section. In other embodiments, however, end 230 may take other shapes, such that its cross-section is noncircular. For example, end 230 may be formed to have a rectangular or square cross-section. In such embodiments, horizontal drainage system 240 remains substantially the same, both in configuration and operation.

Referring again to FIG. 6, during operation of orifice fitting 100, plug 305 is inserted through outlet 272 into throughbore 270 of stuffing box 215 to form a seal therebetween and prevent the loss of pressurized fluid therethrough. When orifice fitting 100 is installed in the horizontal orientation, as shown, moisture which may accumulate within fitting 100 will collect within a region 310 of lower chamber 120 that is proximate end 230 of shaft 195 and thus horizontal drainage system 240. Consequently, when it is desirable to drain the accumulated moisture from orifice fitting 100, plug 305 may be removed from throughbore 270 of stuffing box 215. Once removed, the accumulated moisture within region 310 flows from orifice fitting 100 through biaxial flowbore 265 of horizontal drainage system 240 and throughbore 270 of stuffing box 215. Thus, biaxial flowbore 265 and throughbore 270 are drain passages through which accumulated moisture is removed from orifice fitting 100.

In the above-described embodiment, lower drive assembly 160 of orifice fitting 100 includes shaft 195 that extends into but not through stuffing box 215. As such, when it is desirable to drain accumulated moisture from orifice fitting 100 via horizontal drainage system 240, the accumulated moisture passes from biaxial flowbore 265 into throughbore 270 of stuffing box 215 before exiting fitting 100. In other embodiments of orifice fitting 100, however, lower drive assembly 160 may include a straight shaft that extends through both stuffing boxes 210, 215, rather than just one. In such embodiments, an example of which is shown in FIG. 8, horizontal drainage system 240 is modified relative to its above-described configuration to accommodate the extension of the lower drive assembly shaft through both stuffing boxes 210, 215.

Figure 8:
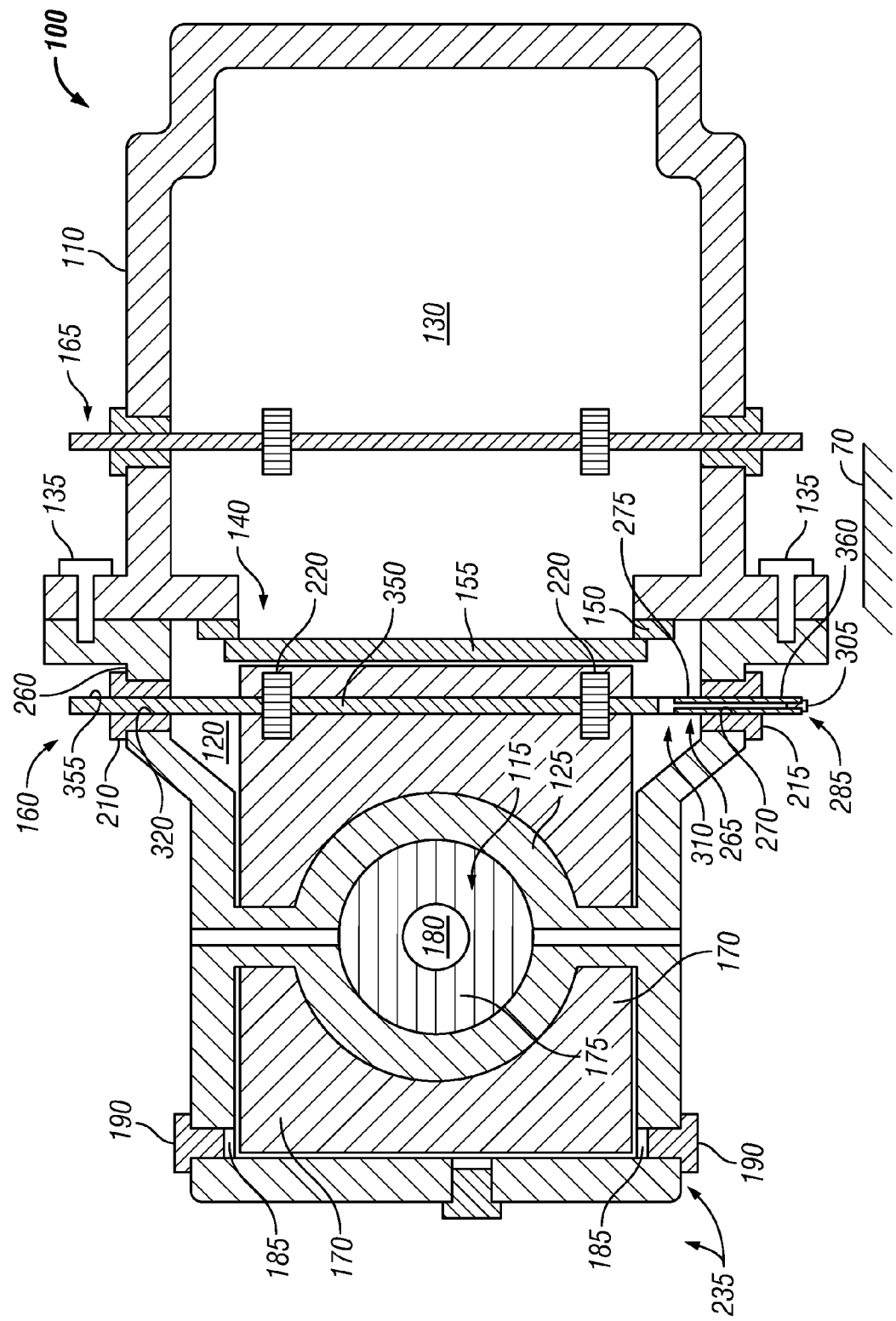
FIG. 8 is a cross-sectional view of another embodiment of a dual chamber orifice fitting with a drainage system in accordance with the principles disclosed herein.

As shown in FIG. 8, lower drive assembly 160 of orifice fitting 100 includes a straight shaft 350 having two ends 355, 360. End 355 extends through stuffing box 210, and end 360 extends through stuffing box 215. As such, shaft 350 is longer than shaft 195, described above. Otherwise, shaft 350 and the remaining components of lower drive assembly 160 remain substantially the same, both in design and operation, as described above in reference to FIGS. 4 through 7.

To accommodate the increased length of shaft 350 in the embodiment of FIG. 8, horizontal drainage system 240 is modified somewhat from its above-described configuration. Biaxial flowbore 265, described above with reference to FIGS. 6 and 7, is disposed within shaft 350 proximate end 360 in the embodiment of FIG. 8. Likewise, in this embodiment, longitudinal flowbore 275 of biaxial flowbore 265 is lengthened to accommodate the increased length of shaft 350. Also, in this embodiment, plug 305 is configured to be insertable into and removable from outlet 285 of longitudinal flowbore 275, rather than throughbore 270 of stuffing box 215. Otherwise, horizontal drainage system 240 remains substantially the same in function and operation to that described above.

During operation of orifice fitting 100 of FIG. 8, plug 305 is inserted into outlet 285 of longitudinal flowbore 275 to form a seal therebetween and prevent the loss of pressurized fluid therethrough. When orifice fitting 100 is installed in the horizontal orientation, as shown, moisture which may accumulate within fitting 100 proximate region 310 may be drained from fitting 100 by removing plug 305 from biaxial flowbore 265. Once removed, the accumulated moisture within region 310 flows from orifice fitting 100 through biaxial flowbore 265 of horizontal drainage system 240. Thus, biaxial flowbore 265 is a drain passage through which accumulated moisture is removed from orifice fitting 100.

Figure 9:
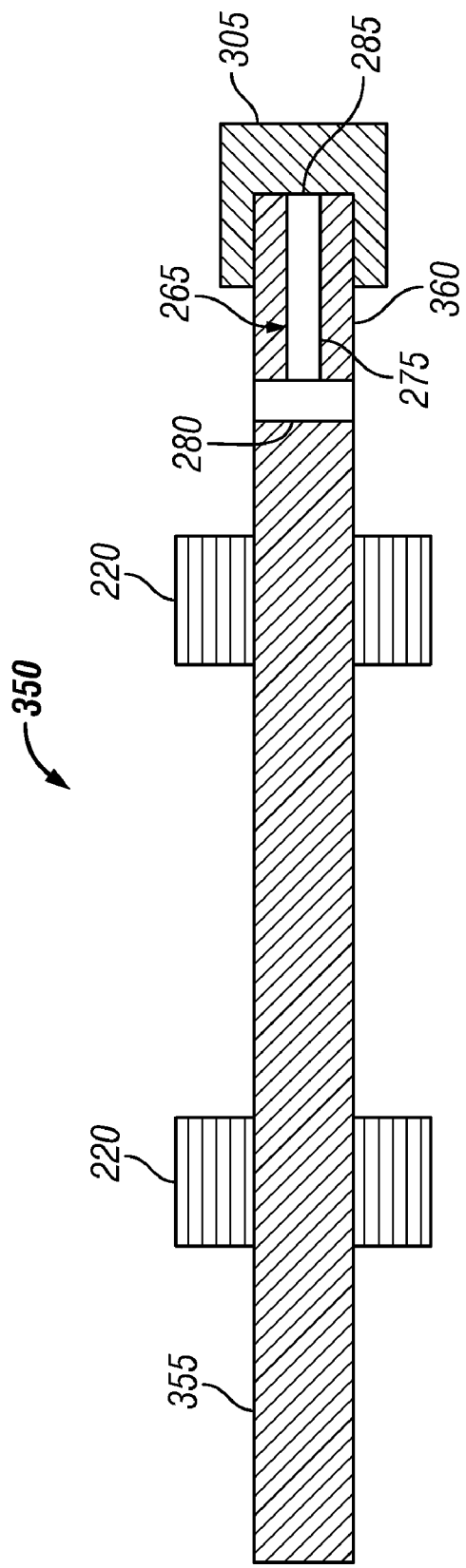
FIG. 9 is a cross-sectional view of the shaft of FIG. 8 with a plug coupled thereto.

In the embodiment of FIG. 8, plug 305 is configured to be insertable through outlet 285 into longitudinal flowbore 275. Alternatively, plug 305 may be configured to couple to shaft 350 over outlet 285 of flowbore 275, as shown in FIG. 9. Otherwise, horizontal drainage system 240 remains substantially the same in function and operation to that described above with reference to FIGS. 6-8.

In the above-described embodiments of FIGS. 6, 8, and 9, horizontal drainage system 240 is disposed within drive shafts 195, 350 of lower drive assembly 160. In other embodiments, horizontal drainage system 240 may be disposed alternatively within gear shaft 205. Aside from being formed within shaft 205, rather than shafts 195, 350, the configuration and operation of horizontal drainage system 240 remains substantially the same as shown in and described with reference to FIGS. 4-8. Still in other embodiments, orifice fitting 100 may include a horizontal drainage system 240 in each of drive shaft 195, 350 and gear shaft 205 for redundancy.

Further, in the above-described embodiments of FIGS. 6, 8, and 9, valve assembly 145 includes valve plate 155 which is actuated by gear shaft assembly 200 to slide relative to valve seat 150 to open and close aperture 140. In other embodiments, the valve assembly may include a valve plate or door that is rotatable, rather than translatable, relative to a valve seat to open and close aperture 140. In such embodiments, the gear shaft is modified to enable rotation of the door and may include a horizontal drainage system in accordance with the principles disclosed herein, as illustrated by FIG. 10.

Figure 10:
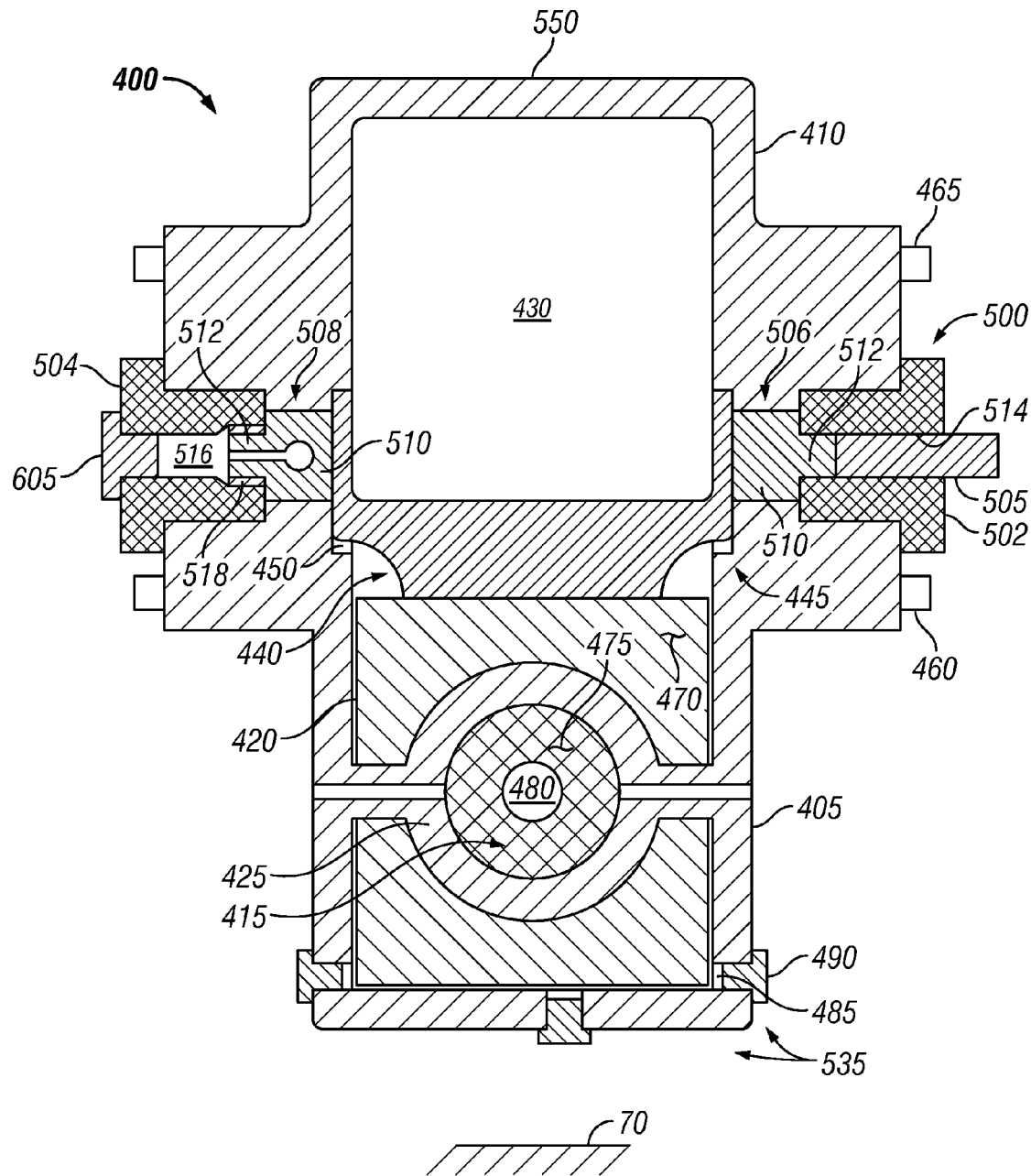
FIG. 10 is a cross-sectional view of yet another embodiment of a dual chamber orifice fitting with a drainage system in accordance with the principles disclosed herein.

Referring to FIG. 10, another embodiment of a dual chamber orifice fitting with a drainage system in accordance with the principles disclosed herein is shown. Orifice fitting 400 is shown in cross-section as viewed from downstream looking upstream. Orifice fitting 400 includes a body 405 and a top 410 coupled thereto. Body 405 encloses a lower chamber 420 in fluid communication with a bore 415 of a flow conduit 425 extending through body 405. When orifice fitting 400 is coupled to a piping section (not shown), bore 415 is in fluid communication with a flowbore through the piping section. Top 410 encloses an upper chamber 430 and has an aperture 440 that defines an opening connecting upper chamber 430 to lower chamber 420.

Orifice fitting 400 further includes a valve assembly 445 operable to open and close aperture 440. Valve assembly 445 includes a valve seat 450 connected to top 410 about aperture 440 and a valve door 455 sealingly engaged with valve seat 450. Valve door 455 is rotatably actuated by gear shaft assembly 500 to open and close aperture 440.

Gear shaft assembly 500 includes a straight shaft 505, two segmented shafts 506, 508, and two stuffing boxes 502, 504. Segmented shafts 506, 508 have a cylindrical body 510 coupled to valve door 455 and a cylindrical extension 512 extending from cylindrical body 510 into throughbores 514, 516 of stuffing boxes 502, 504, respectively. To enable a snug fit, gear shaft assembly 500 further includes a bushing 518 disposed between cylindrical extension 510 of segmented shaft 508 and stuffing box 504. Stuffing boxes 502, 504 extend through opposing sides of fitting body 405 to support segmented shafts 506, 508 and valve door 455 coupled thereto. Straight shaft 505 extends from the exterior of orifice fitting 400 into throughbore 514 of stuffing box 502 to couple with segmented shaft 506. Straight shaft 505 and valve plate 455 coupled thereto are rotatable to open or close aperture 440, as desired.

Orifice fitting 400 further includes a lower drive assembly 460 and an upper drive assembly 465 which are operable to move an orifice plate carrier 470 vertically between lower chamber 420 and upper chamber 430 when aperture 440 is open. Orifice plate carrier 470 sealing engages the wall of body 405 when disposed within bore 415 of flow conduit 425, as shown, and supports an orifice plate 475 having an orifice 480 extending therethrough.

To enable drainage of moisture that may accumulate within orifice fitting 400, including sediment suspended therein, orifice fitting 400 further includes a vertical drainage system 535. Vertical drainage system 535 enables the drainage of moisture that may accumulate within orifice fitting 400 when installed in a vertical orientation, as illustrated. In this orientation, the lowermost portion of fitting 400 is the end 545 of fitting body 405 opposite aperture 440, and the uppermost portion of fitting 400 is the end 550 of fitting top 410 opposite aperture 440. Vertical drainage system 535 includes one or more drain ports 485 and an equal number of plugs 490, each plug 490 insertable within and removable from a drain port 485. Each drain port 485 extends from lower chamber 420 through fitting body 405 proximate end 545.

During operation of orifice fitting 400, a plug 490 is inserted into each drain port 485 to form a seal therebetween and prevent the loss of pressurized fluid therethrough. When orifice fitting 400 is installed in the vertical orientation, as shown, moisture which may accumulate within fitting 400 will collect within a region 415 of lower chamber 420 that is proximate end 545 of fitting 400 and thus vertical drainage system 535. Consequently, when it is desirable to drain the accumulated moisture from orifice fitting 400, plugs 490 may be removed from drain ports 485, thereby enabling the accumulated moisture to flow from orifice fitting 400 through drain ports 485.

Figure 11:
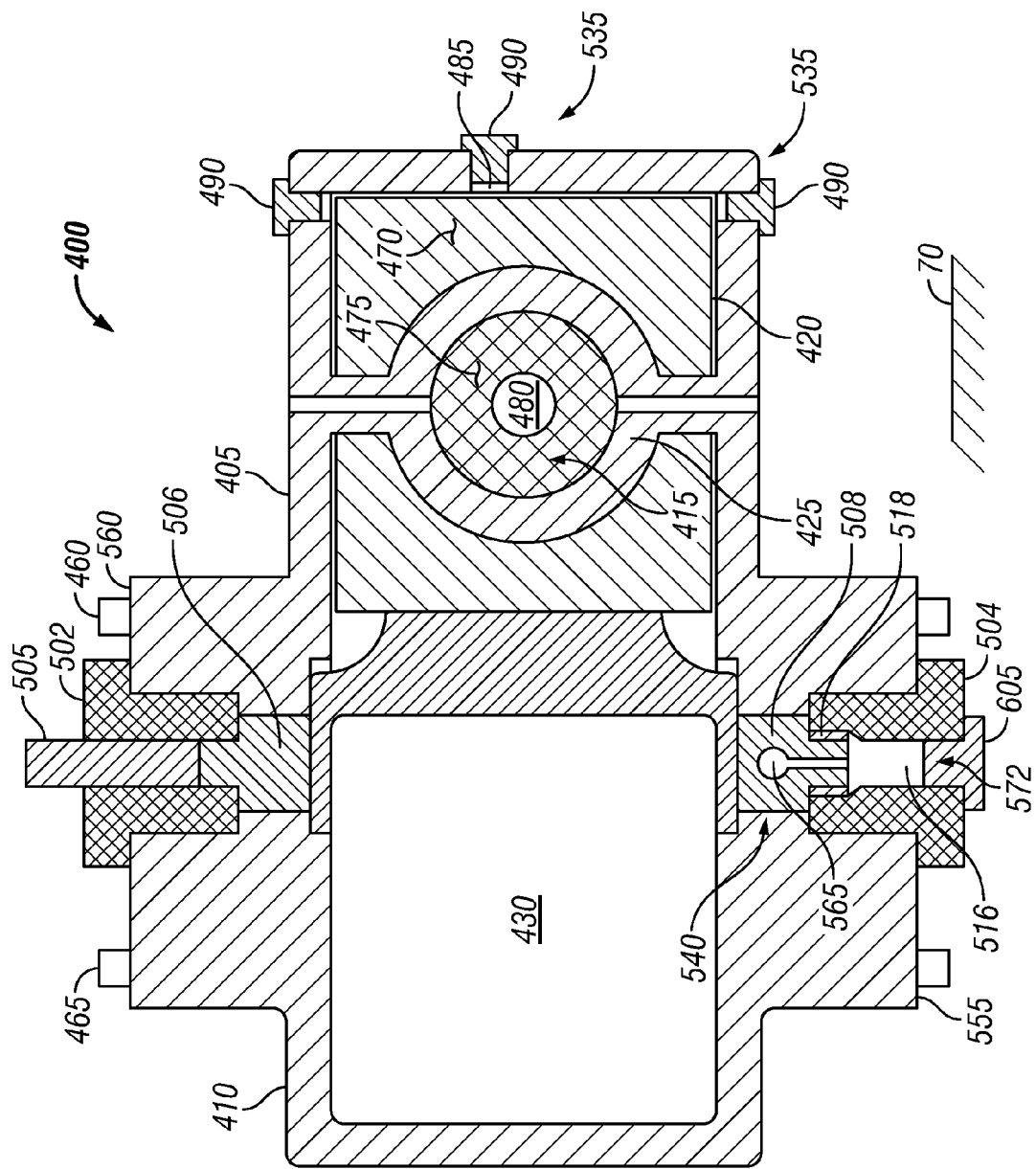
FIG. 11 is a cross-sectional view of the orifice fitting of FIG. 9 installed in a horizontal orientation.

Referring now to FIG. 11, orifice fitting 400 further includes a horizontal drainage system 540 that enables the drainage of moisture that may accumulate within orifice fitting 400 when installed in a horizontal orientation. In this orientation, the side 555 of fitting body 405 through which stuffing box 516 extends is disposed below the side 560 of fitting body 405 through which stuffing box 502 extends. In other words, sides 555, 560 are the lower and upper sides, respectively, of fitting body 405.

Figure 12:
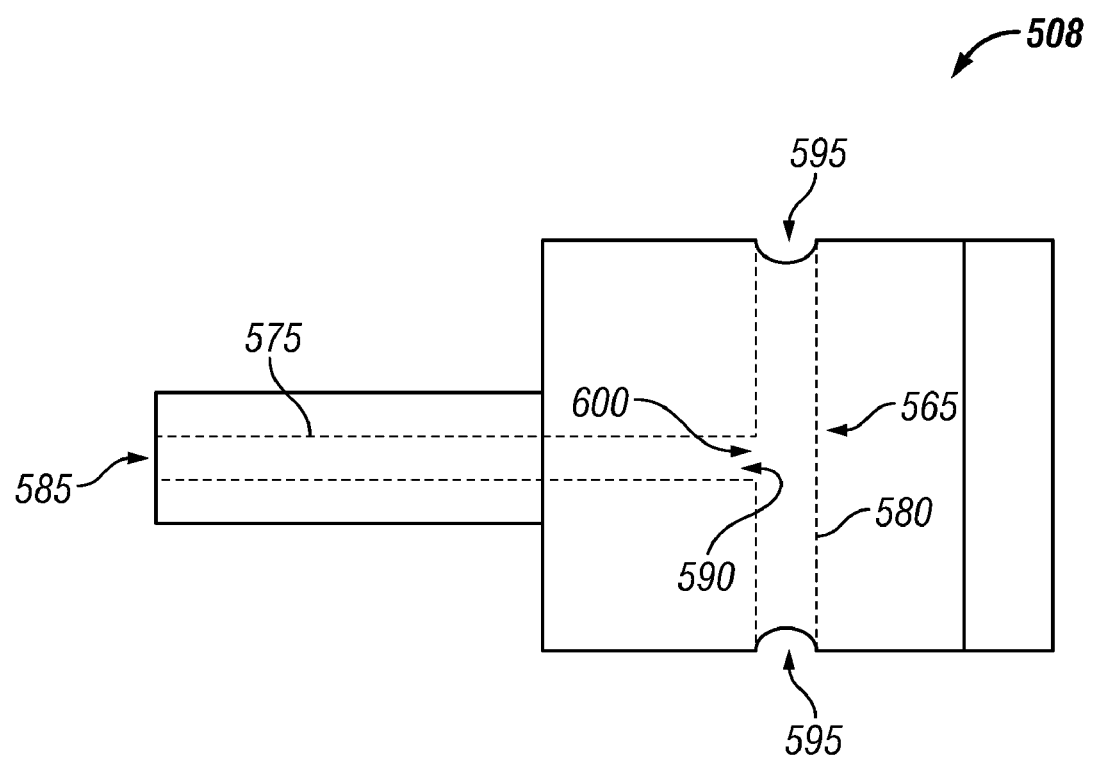
FIG. 12 is a cross-sectional, top view of the segmented shaft of FIG. 9, illustrating a portion of the drainage system formed therein.

Drainage system 540 includes a biaxial flowbore 565 formed in segmented shaft 508 and in fluid communication with lower chamber 420, and a plug 605 that is insertable into throughbore 516 of stuffing box 504. Biaxial flowbore 565 enables fluid communication between lower chamber 420 and throughbore 516. Referring now to FIG. 12, which is a cross-sectional, top view of segmented shaft 508, biaxial flowbore 565 is formed by two intersecting and substantially perpendicular flowbores 575, 580. Flowbore 575 extends longitudinally within segmented shaft 508. Longitudinal flowbore 575 has an inlet 590 and an outlet 585 in fluid communication with throughbore 516 (FIG. 11) of stuffing box 504. Flowbore 580 extends radially through segmented shaft 508. Radial flowbore 580 has two opposing inlets 595 in fluid communication with lower chamber 420 (FIG. 11) and an outlet 600 in fluid communication with inlet 590 of longitudinal flowbore 575.

Referring again to FIG. 1, during operation of orifice fitting 400, plug 605 is inserted into throughbore 516 of stuffing box 504 to form a seal therebetween and prevent the loss of pressurized fluid therethrough. When orifice fitting 400 is installed in the horizontal orientation, as shown, moisture which may accumulate within fitting 400 will collect within lower chamber 420 proximate segmented shaft 508 and thus horizontal drainage system 540. Consequently, when it is desirable to drain the accumulated moisture from orifice fitting 400, plug 605 may be removed from throughbore 516 of stuffing box 504. Once removed, the accumulated moisture within lower chamber 420 flows from orifice fitting 400 through biaxial flowbore 565 of horizontal drainage system 540 and throughbore 516 of stuffing box 504. Thus, biaxial flowbore 565 and throughbore 516 are drain passages through which accumulated moisture is removed from orifice fitting 400.

Embodiments of the disclosure are directed to a drainage system for an orifice fitting, whether installed in a vertical or horizontal orientation. The disclosed embodiments enable the removal of moisture and sediment that may accumulate within an orifice fitting over time. Periodic removal of the accumulated moisture and sediment enables longer service life of the fitting, and/or its subcomponents, and improved flow measurement accuracy of the fitting.

While preferred embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, although the embodiments of a horizontal drainage system disclosed herein are described and shown in the context of a dual chamber orifice fitting, the embodiments are equally applicable to single chamber orifice fittings. Further, the relative dimensions of various parts, the materials from which the various parts are made, and other parameters can be varied. Accordingly, it is intended that the following claims be interpreted to embrace all such variations and modifications.

What is claimed is:

1. A fluid flow measurement system comprising:
a housing having a chamber therein;
a flow path extending through the chamber;
an orifice plate moveable between a first position in said flow path and a second position outside of said flow path; and
a rotatable shaft extending through said housing into the chamber, said shaft comprising a flowbore extending between a first fluid inlet in fluid communication with the chamber and a fluid outlet formed adjacent the end of said shaft.

2. The fluid flow measurement system of claim 1, wherein said shaft is coupled to said orifice plate and rotatable to move said orifice plate between the first position and the second position.

3. The fluid flow measurement system of claim 1, further comprising an aperture in the chamber connecting the chamber to said flow path and a valve assembly adapted to open and to close said aperture, wherein said valve assembly is actuatable by said shaft.

4. The fluid flow measurement system of claim 1, wherein the flowbore comprises:
a radially extending portion having the first fluid inlet; and
a longitudinally extending portion having the fluid outlet and in fluid communication with the radially extending portion.

5. The fluid flow measurement system of claim 4, wherein the radially extending portion fuller comprises a second fluid inlet in fluid communication with the chamber.

6. The fluid flow measurement system of claim 1, wherein the end of said shaft is disposed outside of said housing.

7. The fluid flow measurement system of claim 6, further comprising a removable plug inserted through the fluid outlet of said shaft.

8. The fluid flow measurement system of claim 7, further comprising a removable plug coupled to the end of said shaft over the fluid outlet.

9. The fluid flow measurement system of claim 1, further comprising a drain passage in said housing and wherein the end of said shaft is disposed within said drain passage.

10. The fluid flow measurement system of claim 9, further comprising a removable plug inserted into said drain passage.

11. The fluid flow measurement system of claim 9, further comprising a stuffing box extending through the housing and wherein said drain passage is in said stuffing box.

12. A fluid flow measurement system comprising:
a housing having a chamber therein;
a flow conduit extending through the chamber;
an orifice plate moveable between the flow conduit and the chamber;
a rotatable shaft extending through the housing into the chamber;
a first flow path extending from the chamber through the shaft; and
a second flow path extending from the chamber through the housing.

13. The fluid flow measurement system of claim 12, wherein the first flow path comprises a flowbore in the shaft, the flowbore having:
a radially extending portion with a fluid inlet in fluid communication with the chamber; and
a longitudinally extending portion in fluid communication with the radially extending portion and having a fluid outlet adjacent an end of the shaft.

14. The fluid flow measurement system of claim 13, further comprising a removable plug inserted through the fluid outlet of the shaft.

15. The fluid flow measurement system of claim 13, further comprising a drain passage in the housing and wherein the end of the shaft is disposed within the drain passage.

16. The fluid flow measurement system of claim 15, further comprising a removable plug inserted into the drain passage.

17. The fluid flow measurement system of claim 13, wherein the second flow path comprises a port and further comprising a removable plug inserted into the port.

18. An orifice fitting for measuring the flow rate of fluid passing through a pipe section, the orifice fitting comprising:
a housing with a chamber disposed therein;
a flow path extending through the chamber;
an orifice plate moveable between the chamber and the flow path;
a stuffing box extending through the housing, the stuffing box having a throughbore extending therethrough;
a rotatable shaft extending through the chamber and having an end supported within the throughbore, the shaft comprising a flowbore in fluid communication with the chamber and the throughbore of the stuffing box.

19. The orifice fitting of claim 18, wherein the shaft is coupled to the orifice plate and rotatable to move the orifice plate between the chamber and the flow path.

20. The orifice fitting of claim 19, further comprising an aperture in the chamber connecting the chamber to the flow path and a valve assembly adapted to open and to close the aperture, wherein the valve assembly is actuatable by the shaft.

21. The orifice fitting of claim 19, wherein the flowbore comprises:
a radially extending portion having a fluid inlet in fluid communication with the chamber; and
a longitudinally extending portion in fluid communication with the radially extending portion and the throughbore of the stuffing box.

22. The orifice fitting of claim 18, further comprising a plug inserted into the throughbore of the stuffing box.

* * * * *